United States Patent Office 3,549,622
Patented Dec. 22, 1970

1

3,549,622
SUBSTITUTED KETO-BENZAZOCINES
Eugene E. Galantay, Morristown, N.J., assignor to Sandoz-Wander, Inc., Hanover, N.J., a corporation of Delaware
No Drawing. Filed July 5, 1968, Ser. No. 742,493
Int. Cl. C07d 41/00
U.S. Cl. 260—239.3
4 Claims

ABSTRACT OF THE DISCLOSURE

Substituted keto-benzazocines, e.g., 1 - (2'-dimethylamino-1'-ethyl)-2-keto-6-p-chlorophenyl-8,9 - dimethoxy-1,2,3,4-tetrahydro-1-benzazocine. The compounds are useful as diuretics.

---

This invention relates to keto-benzazocines. More specifically it relates to substituted keto-benzazocines, intermediates therefor, and processes for their preparation.

The benzazocines of this invention may be represented by the formula

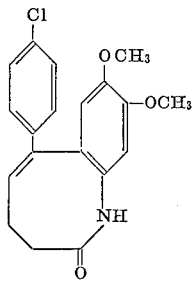

(I)

where R is lower alkyl or

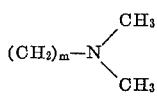

where $m$ is 2 or 3.

The preferred compounds of this invention are 1-methyl - 2 - keto-6-p-chlorophenyl-8,9-dimethoxy-1,2,3,4-tetrahydro-1-benzazocine

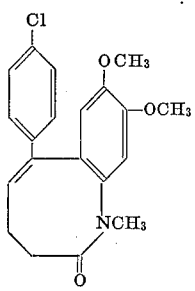

(Ia)

and 1 - (2' - dimethylamino-1'-ethyl)-2-keto-6-p-chlorophenyl-8,9-dimethoxy-1,2,3,4-tetrahydro-1-benzazocine

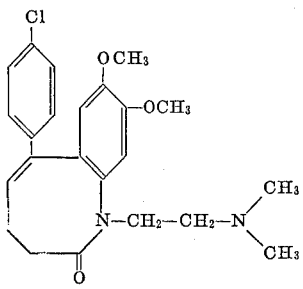

(Ib)

2

The process for preparing the compounds of Formula I may be represented as follows:

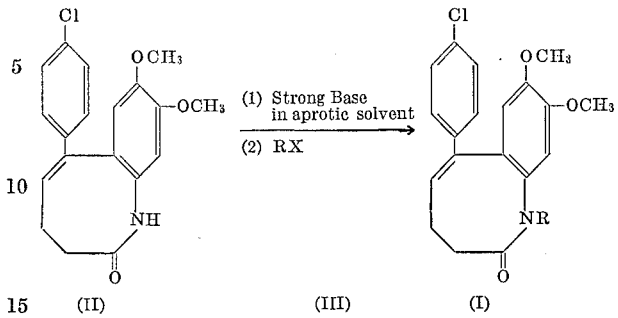

where R has the above stated significance and X=Cl or I.

The benzazocines of Formula I are prepared from the compound of Formula II (2-keto-6-p-chlorophenyl-8,9-dimethoxy-1,2,3,4-tetrahydro-1 - benzazocine) by treatment first with a strong base such as sodium hydried or sodium amide in an aprotic solvent, to form the anion of the lactone,

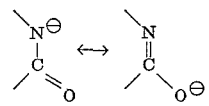

and then treating this intermediate compound with an alkyl halide (III) (e.g. 1-chloro-2-dimethylaminoethane) at a temperature of from 0–50° C., preferably 0–25° C. Among the aprotic solvents which may be used are dimethyl acetamide, dimethyl formamide and the like.

The compound of Formula II may be prepared in accordance with the following reaction scheme:

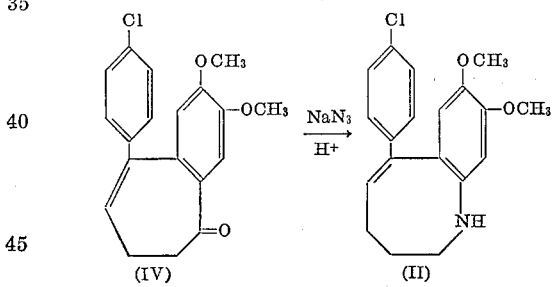

The compound of Formula II is prepared by treating a benzocycloheptenone (IV) (e.g., 1-p-chlorophenyl - 7,8-dimethoxy-3,4-dihydro-5H-benzocyclohepten-5-one) with sodium azide under strong acid conditions at a temperature of −10° C. to 100° C., preferably 30° C. to 70° C. The compound of Formula IV can be prepared by reacting δ-p-chlorophenyl-δ-hydroxyvaleric acid with veratrole in the presence of an acid dehydrating agent.

Those compounds of Formula I which have a basic side chain, e.g.,

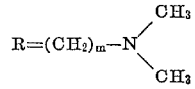

where $m$ is 2 or 3, can be recovered as their acid addition salts. When it is desired to convert such salts to the corresponding free bases, conventional techniques may be utilized, e.g., dissolution of the salt in water and precipitation using a base such as sodium hydroxide.

Using the reaction described above for compounds (I), compounds (Ia) and (Ib) can be prepared. When compound (III) is methyl halide (halo=chlorine or iodine) compound (Ia) 1-methyl-2-keto-6-p-chlorophenyl-8,9-dimethoxy-1,2,3,4-tetrahydro-1 - benzazocine is obtained. When compound (III) is 1-halo-2-dimethylaminoethane (halo=chlorine or iodine) compound (Ib) 1 - (2'-dimethylamino-1'-ethyl)-2-keto-6-p-chlorophenyl - 8,9 - dimethoxy-1,2,3,4-tetrahydro-1 - benzazocine is obtained. Conventional recovery techniques are utilized for obtaining the products (Ia) and (Ib).

The compounds of Formula I are useful because they possess pharmacological activity in animals. More particularly, the compounds are useful as diuretics as indicated by their activity in the rat given 6.5 mg./kg. to 50 mg./kg. of animal body weight of active material. The test method used in basically as described by Roy Aston, Toxicol. and Appl. Pharmacol., 1:277, 1959.

The compounds (I) may be combined with a pharmaceutically acceptable carrier or adjuvant. They may be administered orally or parenterally. The dosage will vary depending upon the mode of administration utilized and the particular compound employed.

In general satisfactory results are obtained when the compounds are administered at a daily dosage of from about 0.8 to 100 milligrams per kilogram of animal body weight. This daily dosage is preferably given in divided dosage, e.g., 2 to 4 times a day, or in sustained release form. For most large animals, the total daily dosage is from about 50 to 750 milligrams per kilogram and dosage forms suitable for internal administration comprise from about 12.5 to 375 milligrams of the compound in admixture with a solid or liquid pharmaceutical carrier or diluent.

A representative formulation suitable for oral administration is a tablet prepared by standard tabletting techniques which contain the following.

| Ingredient: | Parts by weight |
| --- | --- |
| 1-(2' - dimethylamino-1-ethyl) - 2 - keto-6-p-chlorophenyl - 8,9 - dimethyl - 1,2,3,4-tetrahydro-1-benzazocine | 75 |
| Tragacanth | 2 |
| Lactose | 14.5 |
| Corn starch | 5 |
| Talcum | 3 |
| Magnesium stearate | 0.5 |

This invention is illustrated but not limited by the following examples.

EXAMPLE 1

2-keto-6-p-chlorophenyl-8,9-dimethoxy-1,2,3,4-tetrahydro-1-benzazocine

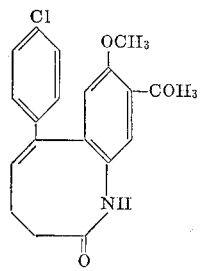

19.9 g. of sodium azide was added at 45° C. to a solution of 55.0 g. of 1-p-chlorophenyl - 7,8 - dimethoxy-3,4-dihydro-5H-benzocyclohepten-5-one in 500 ml. of glacial acetic acid. Under strong stirring and cooling (to maintain a temperature of 50–60° C.) 100 ml. of conc. sulfuric acid was added dropwise (30 minutes). After the acid addition, the temperature was held at 60° C. for an additional 20 minutes. The solution was then poured onto a mixture of 500 g. of sodium hydrocarbonate and 4 kilograms of ice. The 2 - keto - 6 - p - chlorophenyl - 8,9-dimethoxy-1,2,3,4 - tetrahydro-1-benzazocine was separated by filtration and recrystallized from methanol; M.P. 207–...

EXAMPLE 2

1-methyl-2-keto-6-p-chlorophenyl-8,9-dimethoxy-1,2,3,4-tetrahydro-1-benzazocine

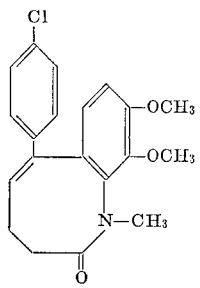

2.33 g. of a 54% sodium hydride-paraffin oil suspension was washed 3 times with 20 ml. (each time) of dry toluene to remove this paraffin oil, and then suspended in 50 ml. of dimethyl acetamide. 18.0 g. of 2-keto-6-p-chlorophenyl-8,9-dimethoxy-1,2,3,4 - tetrahydro - 1 - benzazocine was added and the mixture stirred at room temperature until (~20 minutes) the hydrogen gas evolution ceased and a clear yellow solution resulted. 37.2 g. of methyl iodide was added dropwise with cooling (10–15° C.) and the mixture left at room temperature for 18 hours. The mixture was then poured into 500 ml. of ice water, and the solids filtered and dried. Recrystallization from methanol gave the product 1-methyl-2-keto - 6 - p - chlorophenyl - 8,9-dimethoxy-1,2,3,4-tetrahydro-1-benzazocine; M.P. 197–199° C.

EXAMPLE 3

1-[2'-dimethylamino - 1' - ethyl] - 2 - keto-6-p-chlorophenyl - 8,9-dimethoxy - 1,2,3,4 - tetrahydro - 1 - benzazocine hydrochloride

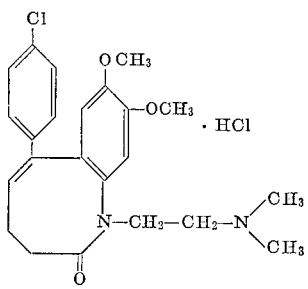

1.04 g. of a 54% sodium hydride-paraffin oil suspension was washed 3 times with 20 ml. (each time) of dry toluene to remove the paraffin oil, and then suspended in 25 ml. of dimethyl acetamide. 8.00 g. of 2-keto-6-p-chlorophenyl-8,9-dimethoxy - 1,2,3,4 - tetrahydro - 1 - benzazocine was added and the mixture stirred at room temperature until (~20 minutes) the hydrogen gas evolution ceased and a clear yellow solution resulted. 12.5 g. of 1-chloro-2-dimethylaminoethane dissolved in 25 ml. of dimethylacetamide was added dropwise with cooling (10–15° C.) and the mixture left at room temperature for 18 hours. The mixture was then poured into 200 ml. of ice water, and the solids filtered and dried. The solids were dissolved in chloroform and treated with ethereal hydrogen chloride which after recrystallization from isopropyl alcohol gave 1 - [2' - dimethylamino - 1' - ethyl] - 2-keto-6-p-chlorophenyl-8,9-dimethoxy - 1,2,3,4 - tetrahydro - 1 - benzazocine hydrochloride; M.P. 221–223° C.

What is claimed is:
1. A compound of the formula

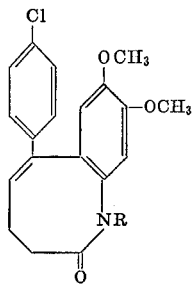

where R is lower alkyl or

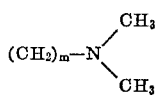

where $m$ is 2 or 3 or, when

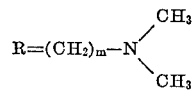

where $m$ is 2 or 3 the acid addition salt thereof.

2. The compound of claim 1 which is 1-methyl-2-keto-6-p-chlorophenyl-8,9-dimethoxy - 1,2,3,4 - tetrahydro - 1-benzazocine.

3. The compound of claim 1 which is 1-(2'-dimethylamino-1'-ethyl)-2-keto - 6 - p-chlorophenyl-8,9-dimethoxy-1,2,3,4-tetrahydro-1-benzazocine or the acid addition salt thereof.

4. 2-keto - 6 - p - chlorophenyl - 8,9-dimethoxy-1,2,3,4-tetrahydro-1-benzazocine.

References Cited
UNITED STATES PATENTS 3,475,416  10/1969  Havera _____ 260—239.3

HENRY R. JILES, Primary Examiner

R. T. BOND, Assistant Examiner

U.S. Cl. X.R.
424—244